United States Patent Office 3,641,001
Patented Feb. 8, 1972

3,641,001
PROCESS FOR PREPARING α-CARBOXY-BENZYLPENICILLIN
Dennis Anthony Love, Redhill, David Patrick John Neal, Reigate, and Eric Pidgeon, Worthing, England, assignors to Beecham Group Limited, Brentford, England
No Drawing. Filed Oct. 9, 1969, Ser. No. 865,182
Claims priority, application Great Britain, Oct. 23, 1968, 50,204/68
Int. Cl. C07d 99/16
U.S. Cl. 260—239.1                           4 Claims

ABSTRACT OF THE DISCLOSURE

α-Carboxybenzylpenicillin and non-toxic salts are prepared by reacting 6-aminopenicillanic acid or a salt with a β-oxo-α-phenylacryloyl halide, preferably the chloride. An acid binding agent is present during the reaction. The β-oxo-α-phenylacryloyl halides are prepared from phenylmalonic acid and a halogenating agent such as $PCl_3$, $PCl_5$ or $POCl_3$.

This invention relates to the preparation of α-carboxybenzylpenicillin, which is described and claimed in Pat. No. 3,282,926. This penicillin is of particular value in the treatment of diseases caused by Gram-negative bacteria, especially Pseudomonas pyocyanea.

Accordingly the present invention provides a process for preparing α-carboxybenzylpenicillin or a non-toxic salt thereof, which process comprises reacting 6-aminopenicillanic acid or a salt thereof with a β-oxo-α-phenylacryloyl halide of the formula:

$$C_6H_5 \cdot (:CO) \cdot CO \cdot Hal$$

wherein Hal is chlorine or bromine.

Preferably β-oxo-α-phenylacryloyl chloride is used.

Preferably an acid binder is used in the reaction, for example sodium bicarbonate, and depending on the stoichiometric amount used, so the free penicillin acid or a mono- or di-salt thereof is obtained.

The resulting penicillin is optionally recovered as a salt.

The salts are non-toxic salts including non-toxic metallic salts such as sodium, potassium, calcium and aluminium, the ammonium salt and substituted ammonium salts e.g. salts of such non-toxic amines as trialkylamines, including triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The starting β-oxo-α-phenylacryloyl halides are novel and may be prepared by heating phenylmalonic acid with at least 2 equivalents of a halogenating agent, such as phosphorus trichloride, pentachloride or oxychloride, and the halide is recovered by distillation or other suitable methods.

The following example illustrates the invention.

EXAMPLE 33.8 g. of 6-aminopenicillanic acid was dissolved in 220 ml. of water at 5° C. by the addition of 10% aqueous sodium hydroxide. Then 65.6 g. of solid sodium bicarbonate was added, followed by 220 ml. of acetone. The mixture was cooled to −15° C. and a solution of 28.2 g. of β-oxo-α-phenylacryloyl chloride in 220 ml. of acetone was added all at once, when a rise in temperature to about −5° C. occurred. The mixture was left at 0° C. for 2 hours, then concentrated by evaporation in vacuo to remove most of the acetone. The residue was washed with 3× 100 ml. of methyl isobutyl ketone, and then stirred and treated with 200 ml. of this ketone, cooled to 5–10° C. and acidified with 2 N-hydrochloric acid to pH 2. The organic layer was separated and the aqueous layer was washed with 100 ml. of methyl isobutyl ketone, and the combined organic phases were washed with 3× 100 ml. of water and 2× 100 ml. of saturated aqueous sodium chloride. The washed organic solution was stirred with 5 g. of active charcoal and 20 g. of a diatomaceous earth filter aid for 20 minutes, then the mixture was filtered and the residual cake was washed with 2× 50 ml. of methyl isobutyl ketone. The total organic solution was extracted with saturated aqueous sodium bicarbonate to pH 6 and the aqueous extract was freeze dried to give off the disodium salt of α-carboxybenzylpenicillin that was found to be 98.1% pure by alkalimetric assay (activity yield 80.5%).

The starting β-oxo-α-phenylacryloyl chloride was prepared as follows: 1 mole of phenylmalonic acid and 2 moles of phosphorus pentachloride were refluxed for 3 hours at 125° C., then the orange liquid was distilled under reduced pressure and the fraction distilling at 54–70° C./0.05–0.3 mm. was collected to give the chloride in 55–86% yield.

Found (percent): C, 58.13; H, 2.78; Cl, 18.61. $C_9H_5O_2Cl$ requires (percent): C, 59.85; H, 2.79; O, 17.73; Cl, 19.63.

The product had an infra-red spectrum showing a strong band at 4.67μ indicative of a ketene.

What is claimed is:
1. A process for preparing α-carboxybenzylpenicillin or a non-toxic salt thereof, which comprises reacting an aqueous solution of 6-aminopenicillanic acid or a non-toxic pharmaceutically acceptable salt thereof with an acetone solution of a β-oxo-α-phenylacryloyl halide of the formula:

$$C_6H_5 \cdot (:CO) \cdot CO \cdot Hal$$

wherein Hal is chlorine or bromine in the presence of an acid binder.

2. A process as claimed in claim 1, wherein the β-oxo-α-phenylacryloyl halide is β-oxo-α-phenylacryloyl chloride.

3. A process as claimed in claim 1, wherein the reaction is carried out in the presence of sodium bicarbonate as an acid binding agent.

4. A process for preparing α-carboxybenzylpenicillin or a non-toxic pharmaceutically acceptable salt thereof which comprises dissolving 6-aminopenicillanic acid in dilute aqueous alkali at low temperature, adding sodium bicarbonate as an acid binding agent and then adding acetone, cooling the mixture, adding a solution of β-oxo-α-phenylacryloyl chloride in acetone, removing acetone and washing and acidifying the residue.

References Cited
UNITED STATES PATENTS
3,282,926    11/1966    Brain et al. _____ 260—239.1

NICHOLAS S. RIZZO, Primary Examiner

U.S. Cl. X.R.

260—544 M